(12) United States Patent
Innocenzi

(10) Patent No.: US 12,246,436 B2
(45) Date of Patent: Mar. 11, 2025

(54) MOTORIZED GRIPPER FOR INDUSTRIAL MANIPULATORS

(71) Applicant: Gimatic S.r.l., Roncadelle (IT)

(72) Inventor: Nazareno Innocenzi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 0 days.

(21) Appl. No.: 18/708,071

(22) PCT Filed: Oct. 28, 2022

(86) PCT No.: PCT/IB2022/060400
§ 371 (c)(1),
(2) Date: May 7, 2024

(87) PCT Pub. No.: WO2023/084350
PCT Pub. Date: May 19, 2023

(65) Prior Publication Data
US 2024/0342925 A1    Oct. 17, 2024

(30) Foreign Application Priority Data

Nov. 9, 2021 (IT) .................. 102021000028421

(51) Int. Cl.
*B25J 15/02* (2006.01)
(52) U.S. Cl.
CPC ............. *B25J 15/02* (2013.01); *B25J 15/028* (2013.01)
(58) Field of Classification Search
CPC .. B25J 15/0004; B25J 15/0253; B25J 15/028; B65G 47/847; B65G 47/902
See application file for complete search history.

(56) References Cited

U.S. PATENT DOCUMENTS

| | | | |
|---|---|---|---|
| 4,607,873 A | 8/1986 | Nusbaumer et al. | |
| 9,670,044 B2 * | 6/2017 | Weber | B67B 3/20 |

(Continued)

FOREIGN PATENT DOCUMENTS

| | | | | |
|---|---|---|---|---|
| IT | PR20090040 A1 | 11/2010 | | |
| WO | WO-2014170235 A1 * | 10/2014 | ......... | B25J 15/0004 |
| WO | 2015070839 A1 | 5/2015 | | |

OTHER PUBLICATIONS

International Preliminary Report on Patentability for International Application No. PCT/IB2022/060400; International Filing Date Oct. 8, 2022; Report Mail Date May 25, 2023 (7 Pages).

(Continued)

*Primary Examiner* — Dean J Kramer
(74) *Attorney, Agent, or Firm* — CANTOR COLBURN LLP

(57) ABSTRACT

A gripper for industrial manipulators, especially for optical inspection devices to inspect transparent or semitransparent containers includes a body and an upper portion constrained to the body and rotatable about the longitudinal axis of the body. An actuator is operable to impart rotations to the upper portion, and jaws are mounted on the upper portion and are movable closer to and away from each other to pick up and release an object. Rotation of the upper portion and activation of the jaws are controlled by the same electric motor housed in the gripper itself. The electric motor rotates a drive shaft coaxial with the longitudinal axis and connected to the upper portion so that the jaws rotate about the longitudinal axis. The assembly formed by the electric motor and the drive shaft may translate along the longitudinal axis to move the jaws and, therefore, open and close the gripper.

11 Claims, 5 Drawing Sheets

(56) References Cited

U.S. PATENT DOCUMENTS

2007/0068117 A1* 3/2007 Lang .................... B67B 3/2033
  53/331.5
2022/0212351 A1* 7/2022 Heimberg ............ B25J 15/0226

OTHER PUBLICATIONS

International Search Report and Written Opinion for International Application No. PCT/IB2022/060400; International Filing Date Oct. 8, 2022; Report Mail Date Jan. 24, 2023 (10 Pages).

* cited by examiner

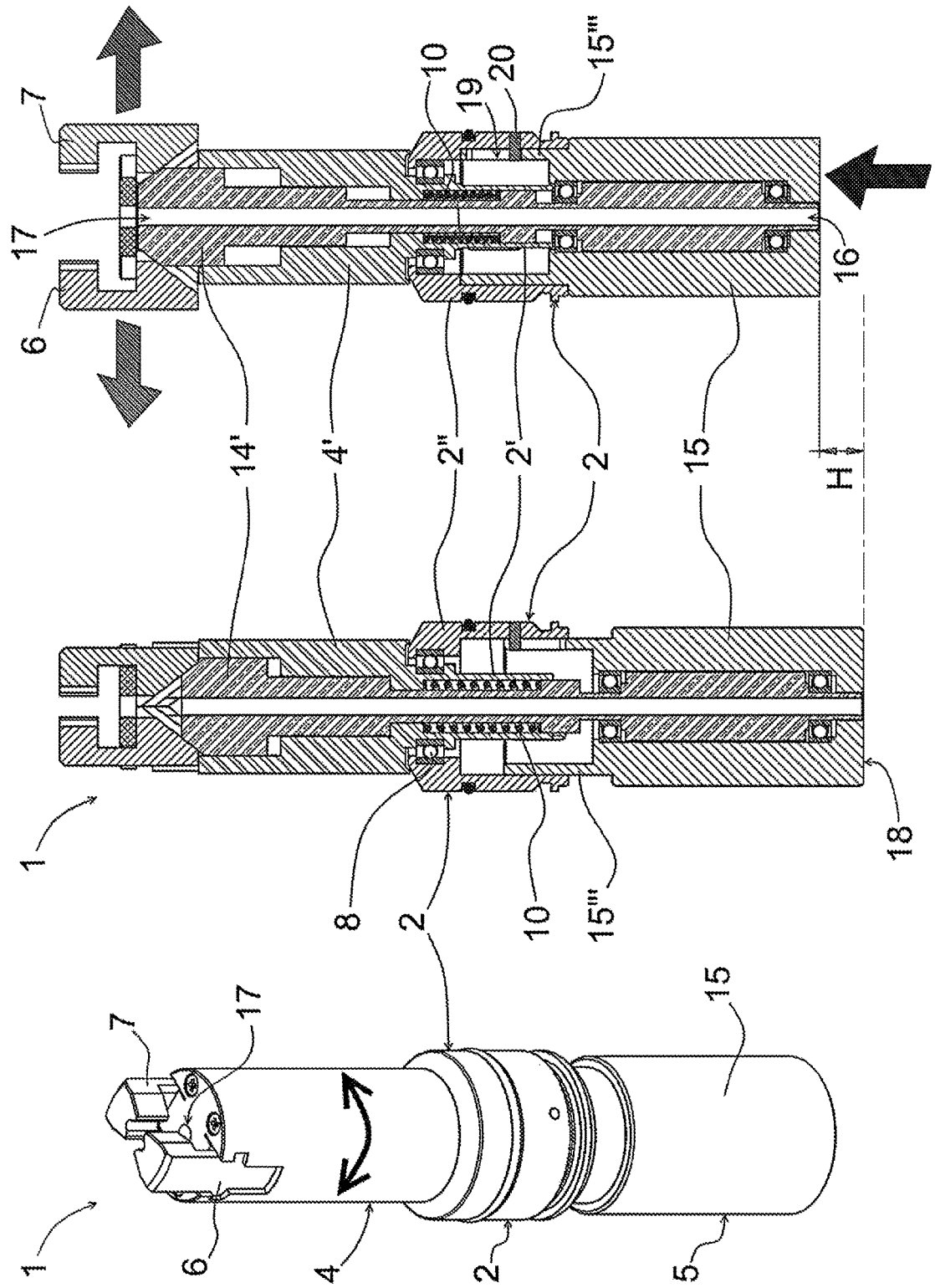

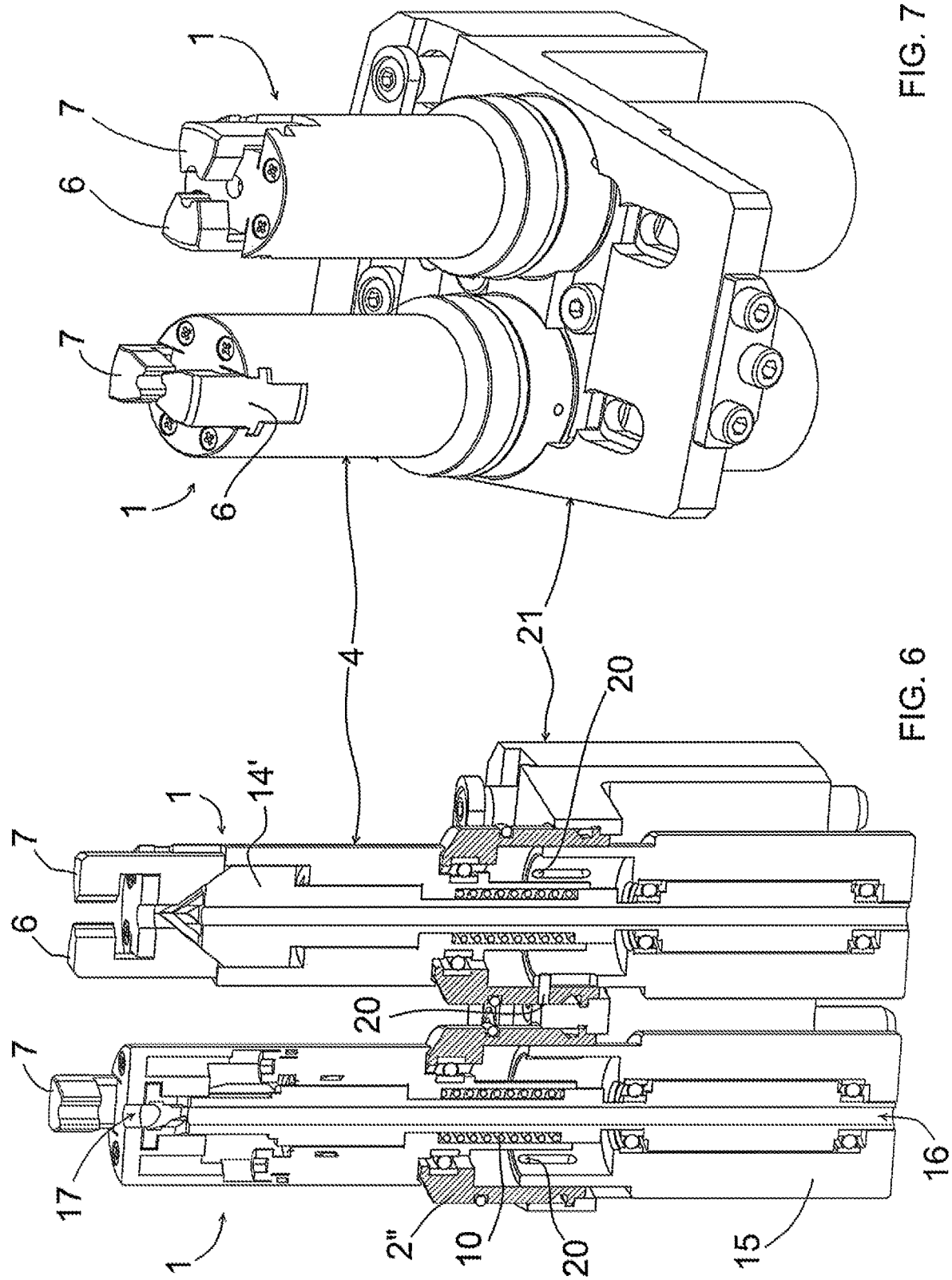

MOTORIZED GRIPPER FOR INDUSTRIAL MANIPULATORS

CROSS REFERENCE TO RELATED APPLICATIONS

This application is a National Stage application of PCT/IB2022/060400, filed Oct. 28, 2022, which claims the benefit of Italian Application No. 102021000028421, filed Nov. 9, 2021, both of which are incorporated by reference in their entirety herein.

FIELD OF THE INVENTION

The present invention relates to a motorized gripper for industrial manipulators, and particularly for container inspection devices in the pharmaceutical industry.

STATE OF THE ART

In the field of industrial automation, the use of grippers combined with manipulators for gripping, moving and releasing objects is known.

The grippers for industrial manipulators are generally provided with a body and two or more jaws, or gripper fingers, mounted thereon. The jaws can be moved away from or closer to each other between an open position, or releasing position, in which they do not exert any pressure on the item to be manipulated, and a closed position, or gripping position, in which they exert to the item to be manipulated sufficient pressure to ensure that the piece is not accidentally released during its handling.

Jaw movement is achieved by exploiting either an electric actuator, such as an electric motor housed in the gripper body, or a pneumatic actuator, such as for example a cylinder-piston system also housed in the gripper body and supplied with compressed air.

The grippers used in inspection devices that perform quality control of containers in the pharmaceutical industry represent a special case. These are optical inspection devices to inspect transparent or semitransparent vials, bottles, containers positioned along the production line in order to carry out quality control of 100 percent of the containers produced, both in terms of the integrity of the container and the respective closure, and in terms of the quantity and purity of the contents. In these inspection devices a plurality of grippers are arranged in a line, or in a circle according to a carousel configuration, with the grippers adjacent to each other. Each gripper picks up a container to bring it in front of a camera that captures one or more images of the container itself; the images are processed by a computer to detect any anomalies. A strobe light is often used to capture the images.

Often, in inspection devices of this type, the grippers are arranged on a carousel structure, and in addition to the traditional opening and closing movement of the grippers, the grippers are required to rotate about their own longitudinal axis, which also corresponds to the axis along which the pieces are gripped, in order to temporarily create a vortex within the containers of liquids to be inspected. The container and vortex images captured by the inspection device allow anomalies to be detected, such as impurities in the contents, or excess or deficient amounts of liquid, etc.

Since the grippers are adjacent to each other and the space available is minimal, in the inspection devices just described grippers without their own actuator are preferred, precisely because actuators would adversely affect the dimensions of each gripper and, ultimately, the overall dimensions of the inspection device.

Generally, the grippers mounted in the inspection devices include a stem slidingly mounted in a special seat of the gripper body; the stem is movable along the longitudinal axis between a distal position and a proximal position in response to a force exerted by a cam controlled by other members of the inspection device. In particular, there is one cam for all the grippers. The position of the stem with respect to the body univocally determines the position of the gripper jaws, that is, it mechanically controls their opening and closing. In other words, the gripping and releasing of the containers are controlled by a cam acting on the sliding stem of each gripper; appropriate springs or other countering means return the stem to the initial closed position of the jaws.

The rotation of the grippers about the longitudinal axis is achieved by mounting the grippers on the carousel structure of the inspection device by a rotating coupling, arranging electric motors on the carousel structure and connecting one or more grippers to the same electric motor by means of a drive belt. The rotation of a pulley of the electric motor is transmitted by the belts to the body of the respective grippers, causing it to rotate about its longitudinal axis. The rotational speed is usually between 400 and 800 rpm, but can also reach 3,000 rpm.

Ultimately, the grippers used in the container inspection devices are different from traditional grippers in that they do not have their own actuator inserted in the gripper body for actuating the jaws, and the operation depends on the cam and electric motor (to which they are connected by means of a belt) that are located on the device, particularly on the carousel structure, and that are not part of the grippers.

An example of an inspection device can be seen in the video that can be reached at this link: https://youtu.be/xC2ed0Tu2NU.

IT202019000002871, filed on Aug. 27, 2019 in the name of the Applicant, describes a gripper for industrial manipulators, especially for optical inspection devices to inspect transparent or semitransparent containers, comprising:

a body, attachable to external structures, provided with a longitudinal axis, an upper portion constrained to the body and rotatable with respect to it about the longitudinal axis, means to impart the rotations of the upper portion about the longitudinal axis, and jaws mounted on the upper portion and movable, with respect to it, closer to and away from each other in order to pick up and release an object, such as a container, i.e., movable to open and close, means to control the opening and closing movement of the jaws.

The rotations of the upper portion are not imparted by belts or other means external to the gripper but by an actuator housed in the gripper itself, specifically an electric motor. In more detail, the gripper comprises a hollow drive shaft arranged on the longitudinal axis of the gripper. The hollow drive shaft is connected to the upper portion, so that the rotations imparted by the electric motor to the drive shaft, with respect to the longitudinal axis, are transmitted to the jaws. Therefore, the longitudinal axis of the gripper is the axis of rotation of the jaws as well. A control rod of the jaws is telescopically, i.e. slidingly, housed inside the drive shaft and has precisely the function of causing the jaws to open.

The displacements of the control rod with respect to the drive shaft are imparted by an actuator external to the gripper, such as a cam of the vial inspection apparatus the gripper is mounted to. When the stress applied by cam on the control rod ceases, an elastic element automatically returns the jaws to close.

IT102009901732640 (IT PR20 090 040), filed on May 15, 2009 in the name of Pharmamech, describes and claims two embodiments of a gripper designed for manipulating test tubes or vials in machines dedicated to quality control. With reference to the relevant figures, both the embodiments are provided with an electric motor and an actuator coaxial with the gripper axis, which controls an outer shaft 8 and a control rod 10 that are coaxially arranged. The outer shaft 8 is hollow and the control rod 10 is inserted therein so as to telescopically slide. In the first embodiment, the outer shaft 8 is a drive shaft rotated by the actuator when the gripper is closed, to cause the test tube or the vial to rotate and allow inspection with an optical system. When the gripper is stationary, the control rod 10 is actuated, i.e., it is translated with respect to the drive shaft 8 in order to open the jaws and release the test tube/vial. In the second embodiment, the actuator is referred to as a "roto-actuator device" 14 and acts only on the control rod 10 which is susceptible both to translations with respect to the drive shaft 8 for opening and closing the gripper, and to rotations to rotate the test tube/vial, while the drive shaft 8 remains idle.

CN1111353 describes a gripper in which the opening and closing are controlled by an axial stem which, however, is controlled by an offset actuator, and the rotation is imparted by a belt and pulley system.

U.S. Pat. No. 6,544,799 describes a gripper system with a longitudinal stem for opening and closing the jaws, but which does not provide for the gripper to rotate.

US20080085507 describes a rotary gripper with 3 jaws: the opening and closing of the jaws is controlled by the same axial motor that controls the gripper rotation, but the movement of the jaws is achieved by rotating the jaws about an axis parallel to the gripper axis by means of spur gears.

US20090179445 describes a gripper equipped with two motors, a first rotary motor that imparts rotation to a hollow drive shaft denoted by 20 in the figures, so as to rotate the jaws, and a second linear motor denoted by 22 in the figures and housed in the drive shaft 20, that acts as a telescoping push rod to open and close the jaws.

DE10120939A describes a gripper with two parallel jaws and an electric actuator. The upper portion of the gripper, which houses the jaws, does not rotate with respect to the gripper body but is fastened thereto. The electric actuator, stationary housed in the gripper body, is provided with a drive shaft susceptible to translatory movements along the longitudinal axis of the gripper to impart the opening and closing movements of the jaws.

Other known solutions are disclosed by WO 2015/070839 and U.S. Pat. No. 4,607,873.

The Applicant believes that the inspection devices described could be improved, made simpler in structure.

SUMMARY OF THE INVENTION

Object of the present invention is to provide a gripper for industrial manipulators, which is motorized, i.e. equipped with its own electric motor to impart the rotations of the upper portion, and has a structure simpler than known solutions.

Therefore, the present invention relates to a gripper according to claim 1.

In particular, the present invention relates to a gripper for industrial manipulators, especially for optical inspection devices to inspect transparent or semitransparent containers, comprising:

a body provided with a longitudinal axis, attachable to an external device, especially an optical inspection device, an upper portion constrained to the body and rotatable with respect to it about the longitudinal axis, jaws mounted on the upper portion and movable, with respect to it, closer to and away from each other in order to pick up and release an object, in particular a container to be checked, and an actuator comprising a single electric motor constrained to the body, and a drive shaft coaxial with the longitudinal axis, which connects the electric motor to the upper portion and the jaws. The electric motor and the body of the gripper are different components, meaning that the fixing of the gripper on a machine is intended on the body and not on the motor.

The drive shaft has a dual function: imparting the rotations to the jaws and causing the jaws to move closer to/away from each other and thus to open and close.

As regards the rotations of the jaws around the longitudinal axis, the drive shaft is rotated by the electric motor about the longitudinal axis and in turn rotates the upper portion to cause the rotation of the jaws.

As regards the movement of the jaws closer to or away from each other, the assembly formed by the electric motor and drive shaft is susceptible to displacements along the longitudinal axis, with respect to the body, in response to stresses imparted by means external to the gripper, particularly in response to stresses imparted by the inspection device, for example by means of cams.

Thanks to this configuration, it is possible to build simpler inspection devices, without gripper actuating belts, and more compact, since carousel structures no longer require to arrange thereon electric motors and drive belts to connect to multiple grippers.

In addition, by fitting out a manipulator or inspection device (of containers) with a plurality of grippers according to the present invention, each gripper can be selectively activated, that is, one gripper can be rotated independently of the other grippers; this is not possible if an electric motor external to the grippers and shared between two, three or more grippers is used.

The proposed solution makes it easier to replace a gripper of the manipulator or inspection device (of containers), as it is no longer necessary to act on any belt drive system, such as the one used so far to rotate the upper portion of the grippers and jaws.

Moreover, thanks to the absence of the drive belts, better levels of cleanliness can be maintained, since belts tend to wear out over time thereby releasing particles that settle on the manipulator or inspection device.

The gripper proposed herein has an extremely simple structure that facilitates assembling and maintenance at low cost. The function of rotating the jaws is assigned to the electric motor, as also provided in other solutions of the known art, but the movement of the jaws getting closer to/away from each other does not require a second actuator, i.e., a dedicated motor. This movement is actually caused by the same electric motor that controls the rotations. The motor is axially movable with respect to the gripper body to impart corresponding travels to the drive shaft, which controls the displacements of the jaws. The axial movements of the motor are imparted by the inspection device the gripper is mounted to, such as, for example, by means of special cam pusher elements. This allows the dimension of the gripper to be minimized and thus the number of grippers that can be mounted on the carousel of the inspection device to be maximized.

Unlike some known solutions, the gripper proposed herein has a single drive shaft instead of two coaxial shafts, one to impart rotation to the jaws and the other to control the opening of the jaws. In the gripper according to the present invention, the single drive shaft fulfills both functions.

Preferably, the gripper comprises a lower portion constrained to the body, on the opposite side with respect to the upper portion, and the electric motor is housed in the lower portion. The drive shaft passes through the body and is slidingly housed in a corresponding seat of the body. This configuration allows the gripper to be arranged on the inspection device so that the cam pusher elements act based on of the electric motor, on the opposite side with respect to the jaws.

Preferably, the radial dimension of the electric motor is less than or equal to the radial dimension of the body; in particular, it is preferable for the gripper to be made with the body that constitutes, among all components of the gripper, the one with the largest diameter.

In the preferred embodiment the gripper body is at least partially hollow and the electric motor is constrained to the body by a telescopic, or piston-like, coupling, being able to translate between a position of maximum insertion into the body, corresponding to the drive shaft retracted and a first position of the jaws, for example spaced apart/open, and a position of minimum insertion into the body, also definable as a partial extraction position, corresponding to the drive shaft extracted and a second position of the jaws, for example close together/closed. In this configuration, basically, the electric motor and the gripper body configure a cylinder-piston coupling.

Preferably, the drive shaft comprises a wedge-shaped portion, also called a slider, at the upper end. The jaws are radially movable with respect to the longitudinal axis and each includes an inclined plane intended to remain in abutment against the wedge-shaped portion of the drive shaft and slide thereon in response to axial displacements of the drive shaft. This way, that is to say by means of the inclined-plane coupling, the axial displacements of the drive shaft cause radial displacements of the jaws.

The just-described configuration of the jaws is not the only one possible. As a matter of fact, the gripper can also be made by adopting either jaws that are translatable between the close position and the spaced position, or jaws that rotate between the two positions, according to configurations known in the field of grippers for industrial automation.

For example, the jaws may be cams rotating between the open and closed positions, or vice versa, due to the thrust exerted by corresponding thrust elements moved by the electric motor. In other words, the movement of the jaws may be angular and not necessarily linear.

Alternatively, the gripper can be made with a rack-and-pinion mechanism for linearly move the jaws, or lever mechanisms, such as in the form of a four-bar linkage, actuated by the electric motor.

Preferably, the gripper comprises an elastic element to counter the displacements of the electric motor with respect to the body, so that the jaws automatically return to one of the positions (spaced, close) selected by the manufacturer. It is usually preferred that the elastic preloaded element constantly exerts a force that pushes the jaws to close on the picked piece. For example, the gripper can be made with the spring constantly pushing the electric motor to the position extracted from the body (or vice versa), if this position corresponds to the jaws brought closer to each other and closed on the piece.

Preferably, in order to minimize the dimension and have a simple structure, the elastic element is a helical spring fitted on the drive shaft and housed inside a body bushing that also operates as a guide for the drive shaft. Thus, in this configuration, the drive shaft, the helical spring and the guide bushing are coaxial.

In the preferred embodiment, the drive shaft is hollow to allow optical fibers or electrical wires to be inserted therein in order to power attachments. The drive shaft passes through the gripper and is open at its two ends, i.e. it has a lower first opening accessible from the base of the electric motor, and an upper opening accessible at the upper portion, between the jaws.

BRIEF LIST OF THE FIGURES

Further characteristics and advantages of the invention will be more evident from the review of the following detailed description of its preferred, but not exclusive, embodiments depicted for illustration purposes only and without limitation, with the aid of the attached drawings, wherein:

FIG. 3 is a perspective view of the gripper shown in FIG. 1;

FIG. 4 is a vertical section view of the gripper shown in FIG. 1, whose jaws are close to each other or closed;

FIG. 5 is a vertical section view of the gripper shown in FIG. 1, whose jaws are spaced or open;

FIG. 6 is a perspective and circumferential section view of two grippers according to the present invention, which are mounted on a carousel structure of a container inspection device;

FIG. 7 is a perspective view of two grippers according to the present invention, which are mounted on a carousel structure of a container inspection device;

DETAILED DESCRIPTION OF THE INVENTION

Figure 1:
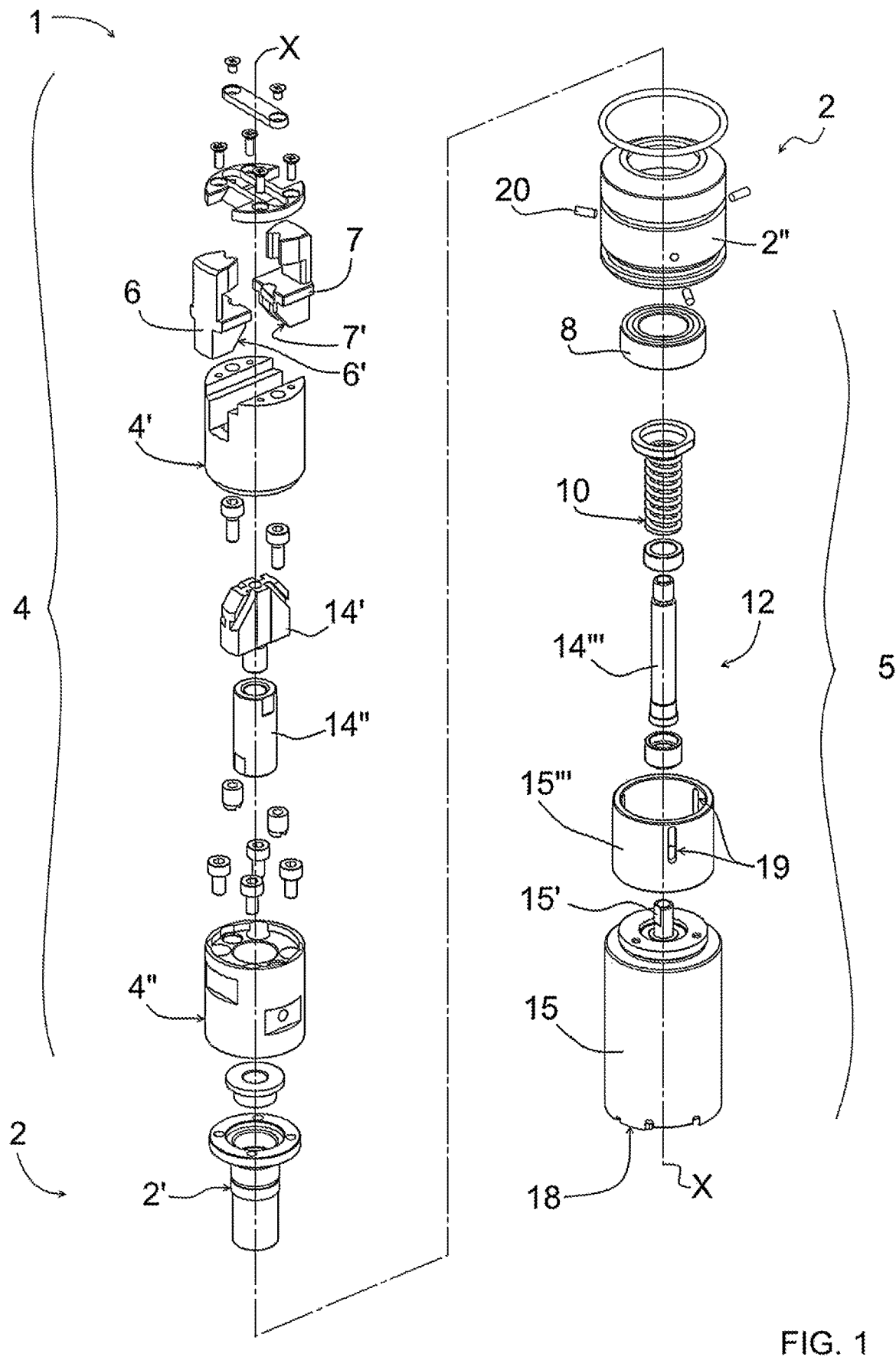
FIG. 1 is an exploded and elevation view of a gripper according to the present invention.
Figure 2:
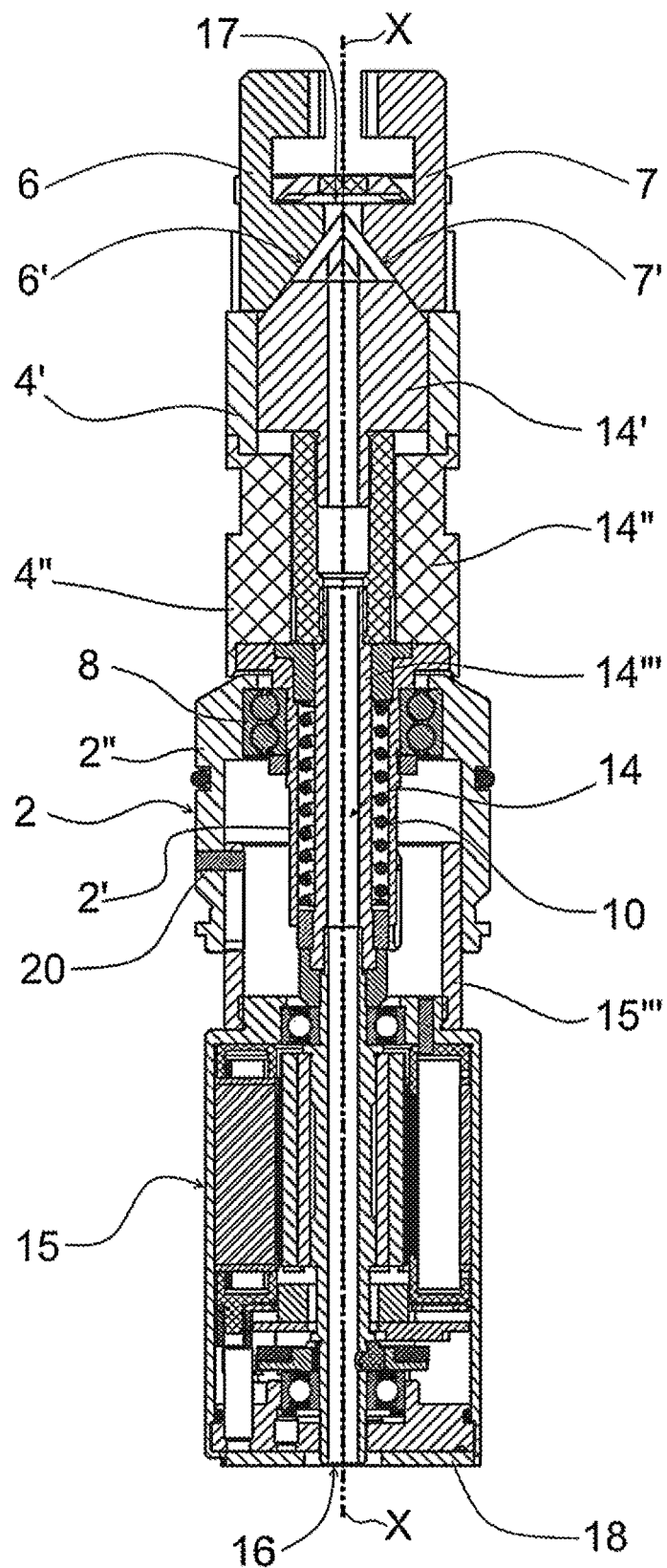
FIG. 2 is a vertical section view, that is to say considered in a plane containing the longitudinal axis of the gripper shown in FIG. 1.

FIGS. 1-5 show a first embodiment 1 of the gripper for industrial manipulators according to the present invention.

The gripper 1 comprises a body 2 that can be attached to an external structure, such as a plate that is part of a carousel structure of an inspection device for transparent or semi-transparent containers, such as those normally used in the pharmaceutical industry. In the embodiment shown, the body 2 comprises two components: a bushing 2' and an element 2" that can be attached to the external structure.

The gripper 1 comprises an upper portion 4 formed by two substantially cylindrical elements 4', 4", and a lower portion 5, which portions are arranged on opposite sides with respect to the body 2.

In general, the gripper may comprise a plurality of jaws, such as three, in the embodiment 1 shown in the figures, in the upper portion 4 there are two jaws that are identified by the reference numbers 6 and 7 and are movable in appropriate seats of the element 4' (visible in FIG. 1). In particular, the jaws 6 and 7 can be moved away from or closer to each other for gripping and releasing the containers to be inspected.

As the person skilled in the art will understand, the terms upper and lower referring to the portions of the gripper 1 are based on the orientation of the gripper 1 in the attached figures but during the use of the grippers 1, the upper portion 4 may actually face downward, i.e., the grippers 1 may be used upside down with respect to the situation shown in the attached figures.

In more detail, the jaws 6 and 7 are radially movable between a position proximal with respect to the longitudinal axis X-X of the gripper 1, corresponding to the piece gripping position, and a position distal with respect to the longitudinal axis X-X, corresponding to the piece releasing position.

As will be described in more detail, the upper portion 4 is rotatable with respect to the body 2 about the longitudinal axis X-X. That is why the upper portion 4 is supported on a bearing 8.

The gripper 1 further comprises a single electric motor 15 that, in the embodiment shown, is constrained to the lower portion 5. The electric motor 15 is provided with its own shaft 15' arranged on the longitudinal axis X-X. The gripper is provided with a drive shaft 14 connected to the shaft 15' of the electric motor 15, so as to configure a single drive shaft 14 passing through the entire gripper 1.

The drive shaft 14 is made by joining the components 14', 14" and 14'" (FIG. 1), where the first component 14' is wedge-shaped.

Activation of the jaws 6 and 7 is achieved by means of the drive shaft 14, which is housed in a seat 2' of the gripper body 2 so as to slide on the longitudinal axis X-X between a distal or extracted position corresponding to the jaws 6, 7 in the close or closed position, and a proximal or retracted position corresponding to the jaws 6-7 in the spaced or open position.

In more detail, the drive shaft 14 is countered by an elastic means 10, for example the spring 10 visible in the figures, fitted on the drive shaft 14 and inserted into the bushing 2' that defines the seat in which the drive shaft 14 is slidingly housed, so that the drive shaft 14 is telescopic with respect to the body 2 of the gripper 1. When stress that causes the electric motor 15 and the drive shaft 14 to move, with respect to the body 2 toward the jaws 6 and 7, ceases, the drive shaft 14 is automatically returned to its initial position by the elastic element 10.

The upper end of the drive shaft 14 is wedge-shaped, i.e. the portion denoted by the reference 14' and which is inserted between the jaws 6, 7, meaning that it has a wedge structure having the function of a slider with inclined planes. That portion 14' is intended to be inserted right between the jaws 6 and 7 to spread them out, i.e., to cause them to open and bring them to the spaced, opening position, for example to release the previously picked piece. For this purpose, the jaws 6 and 7 are provided with corresponding inclined planes 6' and 7' (FIG. 1) intended to come in abutment against and move on the portion 14' of drive shaft 14 (inclined-plane coupling).

The activation of the jaws 6-7 as regards the movement close to and away from each other, i.e., the opening and closing movements, occurs by causing the drive shaft 14 to translate toward the jaws 6-7 themselves; the wedge-shaped end 14' of the drive shaft 14 is inserted between the jaws 6-7 and spreads them out, for example to bring them to the piece releasing position.

The thrust on the drive shaft 14 is applied by the electric motor 15, which is axially movable with respect to the body 2 of the gripper 1, as will be described later. In turn, the electric motor 15 is stressed to make axial displacements along the longitudinal axis X-X by external means. For example, in a container inspection device, the external means are a cam pusher of the inspection device applies a thrust on the motor 15 in due time, as denoted by the upward arrow and the diverging arrows in FIG. 5. The electric motor 15 is partially pushed inside the gripper body 2, thus making a travel H (FIGS. 4 and 5) preferably in the range 5-15 mm, for example 8 mm. In the embodiment shown in the figures, the axial travel H of the electric motor 15 corresponds to the axial travel of the drive shaft 14, since these two components move jointly on the longitudinal axis X-X.

FIG. 5 shows the gripper 1, in vertical section, in the configuration with the jaws 6, 7 open: the motor 15 is in the position of maximum insertion into the body 2, meaning that the travel H is maximum, and the drive shaft 14 is in the fully retracted position corresponding to the wedge-shaped portion 14' inserted between the spread-out jaws 6, 7.

FIG. 4 shows the gripper 1, in vertical section, in the configuration with the jaws 6, 7 closed: the motor 15 is in the position of minimum insertion into body 2, meaning that the travel H is zero, and the drive shaft 14 is in the fully extended position corresponding to the wedge-shaped portion 14' not inserted between the jaws 6, 7, which remain close together, in the proximal position, i.e., closed. In more detail, when the stress imparted by the external pusher element ceases, the elastic element 10 returns the drive shaft 14 to its initial position, i.e., the wedge-shaped end 14' retracts and the jaws 6-7 move back to the proximal, piece gripping position in the example shown.

The gripper may also comprise an elastic element (not visible in the figures) to close the jaws 6-7. The elastic element, such as a spring or an annular gasket, engages the two jaws 6-7 and constantly exerts a force thereon that tends to bring the jaws 6-7 closer together and, thus, tends to close them.

The jaws 6-7 are susceptible not only to radial motion, described above, for gripping and releasing the piece but also to rotary motion about the longitudinal axis X-X. This motion is directly imparted by the drive shaft 14, which is rotated by the electric motor 15 and in turn rotates the upper portion 14 with respect to the gripper body 2. In fact, the wedge-shaped portion 14' of the drive shaft 14, because of its shape, is not rotatable in the component 4' of the upper portion 4.

In the gripper 1 shown in the figures, the upper portion 4 is supported on the body 2 by the ball bearing 8.

Therefore, the activation of the electric motor 15 causes the upper portion 4 of the gripper 1 to rotate clockwise or counterclockwise about the longitudinal axis X-X. In container inspection devices, this condition occurs with the jaws 6-7 in the piece gripping position, that is, with the jaws close together.

The electric motor 15 can be equipped with an encoder, which then allows the rotational speed of the shaft 15' to be monitored, so that this speed can be feedback controlled; in addition, the encoder allows the angular position the upper portion 4 of the gripper 1 takes at any time to be detected, so that, if required, the jaws 6-7 can be aligned with respect to the piece to be picked up or released or with respect to other parts of the inspection device.

Considering now in more detail the coupling between the electric motor 15 and the gripper body 2, it can be defined of a cylinder and piston type. Looking at the figures, in fact, it can be seen that the body 2 is hollow and more precisely has a (inverted) socket shape. The electric motor 15 has a cylindrical portion 15''' that defines in the upper part of the motor a skirt facing the body 2 (these two components are screwed to each other). The skirt element 15''' has slots 19 passing through its side surface and engaged by pins 20 integral with the body 2, and particularly with the socket-shaped component 2''', to delimit the limit stops of the electric motor 15.

As can be seen in FIGS. 4 and 5, the skirt portion 15''' of the electric motor 15 is slidingly inserted into the socket-shaped portion 2''' of the body 2 and defines therewith a piston-like coupling or cylinder-and-piston coupling. The drive shaft 14 is coaxially inserted into the bushing 2', with the spring 10 fitted on the shaft 14. The pins 20 define the limit stop in the two directions of the axial displacements of the electric motor 15.

In general, it is advantageous to have the electric motor 15 inside the grippers 1 especially in the case where, as shown in the figures, the radial dimension of the motor 15 does not exceed the radial dimension of the remaining parts of the gripper 1. In fact, in the example shown in the figures, the lower portion 5 has the same outer diameter as the gripper body 2; therefore, in general, it is preferable that the diameter of the lower portion 5, where the electric motor 15 is housed, is less than or equal to the diameter of the gripper body 2.

Preferably, the drive shaft 14 is hollow and extends between a lower opening 16, at the base 18 of the electric motor 15, and an upper opening 17, at the upper portion 4, between the jaws 6 and 7. Optical fibers, or electrical wires for powering attachments of the gripper 1 or possibly for compressed air supply or air suction, if required by the specific application, can be inserted through the drive shaft.

It is useful to note that there isn't a second coaxial shaft within the drive shaft 14, as provided in some solutions according to the known art, and this greatly simplifies the structure and leaves room for the attachments just mentioned.

With particular reference to FIGS. 6 and 7, a possible way of assembling two grippers 1 on the same structure 21 of a container inspection device (not shown) is shown. The structure 21 is a slice of a larger carousel structure. The grippers 1 are side by side and are shown with the jaws 6-7 orthogonally oriented, i.e., the right gripper 1 has tangentially oriented jaws and the left gripper 1 has radially oriented jaws 6-7, with respect to the structure 21.

As mentioned above, the grippers 1 are locked on the structure 21 at the element 2" of the body 2, which therefore remains stationary with respect to the structure 21. The upper portion 4 of the grippers 1, and together with it the jaws 6-7, are rotatable about the longitudinal axis X-X by virtue of the operation of the electric motor 15 of each gripper 1, that is, without using a drive belt connected to the inspection device.

Clearly, in the configuration just described, the electric motors 15 of each gripper 1 can be activated selectively and independently of each other. Therefore, the jaws 6-7 of a gripper 1 can be rotated independently of the jaws 6-7 of the adjacent gripper 1, whereas this is not the case in nowadays solutions, in which an external motor actuates multiple grippers via corresponding drive belts and the activation of the shared motor results in the simultaneous rotation of all grippers connected thereto.

As mentioned above, the arrangement of the electric motor 15 inside the grippers 1 is advantageous especially in the case where, as shown in the figures, the radial dimension of the motor 15 does not exceed the radial dimension of the remaining parts of the gripper 1. In fact, in the example shown in the figures, the lower portion 5 has the same outer diameter as the gripper body 2.

In particular, because the motor 15 is contained within the radial dimension of the gripper 1, a minimum moment of inertia of the motor 15 with respect to the longitudinal axis X-X has been achieved, and this allows acceleration and deceleration ramps of the motor 15 to be shorter than would be possible with conventional solutions.

An operation cycle of each gripper 1 can be described as follows:
- by applying upward pressure on the motor 15, through a cam pusher element constrained to the structure 21 and not shown, the translation of the motor 15 is transmitted to the drive shaft 14;
- the jaws 6-7 are spread out in response to the thrust applied by the wedge-shaped portion (slider) 14' and the respective inclined planes;
- when the thrust applied to the motor 15 ceases, the spring 10 returns the motor 15 to its initial position extracted from the body 2, and the jaws 6-7 are brought to their initial closed position;
- the rotation of the upper portion 4, and of the jaws 6-7 therewith, is imparted by the motor 15 by means of the drive shaft 14, which through the wedge-shaped portion 14' drives the upper portion 4 to rotate, while the body 2 and the bushing 2' remain stationary;
- in order to prevent the relative rotation between the motor 15 and the body 2, pins 20 (anti-turn) constrained to the portion 2''' of the body 2 and inserted into the slots 19 of the portion 15''' of the motor 15 are used.

Figure 8:
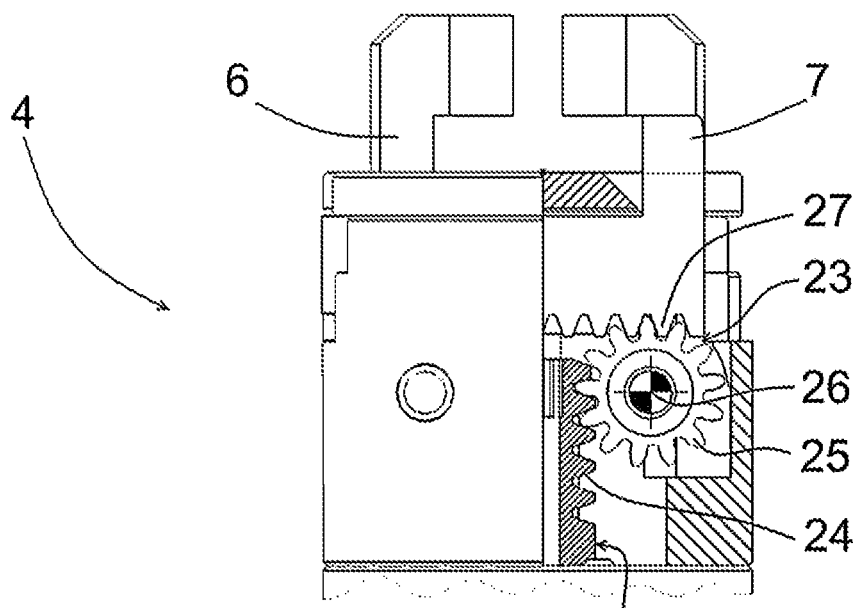
FIG. 8 is an elevation and partial section view of a portion of a gripper according to an alternative embodiment of the present invention.

FIG. 8 shows an elevation and partial vertical section view of a portion 4 of an alternative embodiment of the gripper according to the present invention, in which the jaws 6 and 7 are moved by a rack-and-pinion mechanism altogether denoted by the reference number 23.

The drive shaft 14 has a toothed portion 24 that meshes with a gear wheel 25 rotating about a rotational axis 26 skew with respect to the longitudinal axis X-X. In turn, the gear wheel 25 meshes with the rack 27 formed at the lower surface of the jaw 7. There is the same mechanism for the jaw 6.

Figure 9:
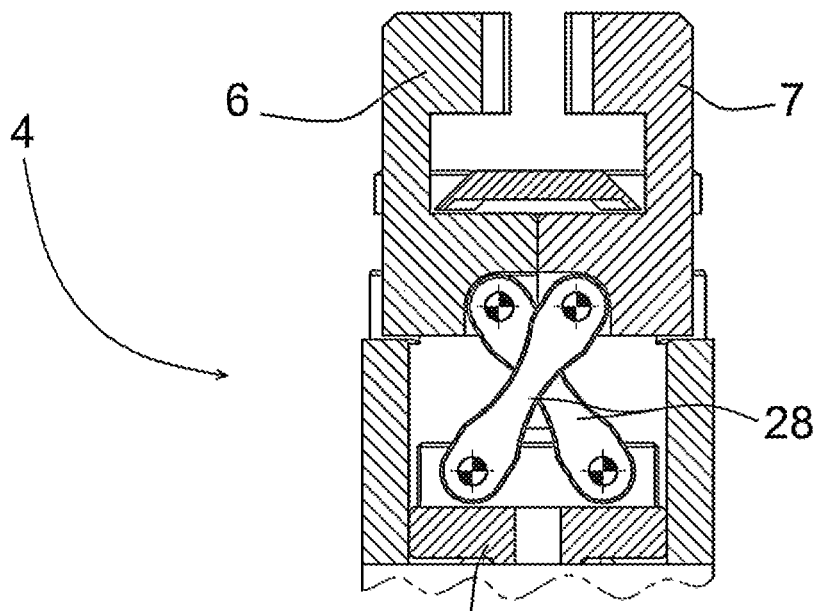
FIG. 9 is an elevation and sectional view of a portion of a gripper according to a further embodiment of the present invention.

FIG. 9 is an elevation and vertical section view, considered in a plane containing the longitudinal axis X-X, of the upper portion 4 of a gripper according to a further embodiment of the present invention, in which the jaws 6 and 7 are connected to the drive shaft 14 by means of levers 28 pivoted both to the drive shaft and to the jaws 6, 7, on axes of rotation skew with respect the longitudinal axis X-X. As can be seen in the figure, the levers 28 cross each other.

As an alternative to the linear movement of the jaws 6, 7, the gripper 1 can be made with jaws able to rotate, between the open and closed positions, in a plane orthogonal to the longitudinal axis X-X.

The invention claimed is:

1. A gripper (1) for optical inspection devices to inspect transparent or semi-transparent containers, comprising:
    a body (2) provided with a longitudinal axis (X-X) and attachable to an external device, an upper portion (4) constrained to the body (2) and rotatable with respect to the body about the longitudinal axis (X-X), jaws (6-7) mounted on the upper portion (4) and movable, with respect to the upper portion, closer to and away from each other in order to pick up and release a container, an actuator (12) comprising a single electric motor (15) constrained to the body (2), and a drive shaft (14) coaxial with the longitudinal axis (X-X), which connects the electric motor (15) to the upper portion (4) and the jaws (6-7), wherein the drive shaft (14) is rotated by the electric motor (15) about the longitudinal axis (X-X) and in turn causes the upper portion (4) to rotate, and wherein an assembly formed by the electric motor (15) and the drive shaft (14) is displaceable along the longitudinal axis (X-X), with respect to the body (2), in response to stresses imparted by means external to the gripper (1), in order to impart movement that transforms the jaws (6-7) closer to and away from each other.

2. The gripper (1) according to claim 1, comprising a lower portion (5) constrained to the body (2), on the opposite side with respect to the upper portion (4), and wherein the electric motor (15) is housed in the lower portion (5) and the drive shaft (14) passes through the body (2) and is slidingly housed in a corresponding seat (2''') of the body (2).

3. The gripper (1) according to claim 1, wherein a radial dimension of the electric motor (15) is less than or equal to the radial dimension of the body (2).

4. The gripper (1) according to claim 1, wherein the electric motor (15) comprises a shaft (15') of the electric motor coupled to the drive shaft (14).

5. The gripper (1) according to any claim 1, wherein the body (2) is at least partially hollow and the electric motor (15) is constrained to the body (2) by a telescopic coupling, the electric motor being movable between a position of maximum insertion into the body (2), corresponding to the drive shaft (14) retracted and the jaws (6-7) at a first position, and a position of minimum insertion into the body (2), corresponding to the drive shaft (14) extracted and the jaws (6-7) at a second position.

6. The gripper (1) according to claim 1, wherein the drive shaft (14) comprises a wedge-shaped portion (14') at an upper end, and wherein the jaws (6-7) are radially movable with respect to the longitudinal axis (X-X) and each comprises an inclined plane (6', 7') intended to remain in abutment against the wedge-shaped portion (14') and slide thereon in response to axial displacements of the drive shaft (14), so that axial displacements of the drive shaft (14) cause radial displacements of the jaws (6-7).

7. The gripper (1) according to claim 1, comprising an elastic element (10) to counter the displacement of the electric motor (15) with respect to the body (2).

8. The gripper (1) according to claim 7, wherein the elastic element (10) is a helical spring fitted on the drive shaft (14) and housed inside a bushing (2''') of the body (2) that guides the drive shaft (14), so that the drive shaft (14), the helical spring (10) and the bushing (2''') are coaxial.

9. The gripper (1) according to claim 7, wherein the elastic element (10) is preloaded and constantly exerts a force on the electric motor (15) in a direction corresponding to the jaws (6-7) closing on a picked piece.

10. The gripper (1) according to claim 1, wherein a travel (H) of the electric motor (15) with respect to the body (2) is between 5 mm and 15 mm.

11. The gripper (1) according to claim 1, wherein the drive shaft (14) is hollow and passes through the gripper (1), being provided with a first lower opening (16) accessible from a base (18) of the electric motor (15), and an upper opening (17) accessible at the upper portion (4), between the jaws (5-7).

* * * * *